(12) United States Patent
Liao et al.

(10) Patent No.: US 12,542,337 B2
(45) Date of Patent: Feb. 3, 2026

(54) LIQUID INJECTION SYSTEM FOR BATTERY AND TRANSFER DEVICE THEREOF

(71) Applicant: CONTEMPORARY AMPEREX TECHNOLOGY CO., LIMITED, Ningde (CN)

(72) Inventors: Tongzhang Liao, Ningde (CN); Jian Zhang, Ningde (CN); Hongyan Liao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/240,741

(22) Filed: Jun. 17, 2025

(65) Prior Publication Data

US 2025/0316868 A1     Oct. 9, 2025

Related U.S. Application Data

(63) Continuation of application No. PCT/CN2024/113708, filed on Aug. 21, 2024.

(30) Foreign Application Priority Data

Jan. 22, 2024  (CN) .......................... 202420148475.4

(51) Int. Cl.
  *H01M 50/609*  (2021.01)
  *B65G 47/80*  (2006.01)
(52) U.S. Cl.
  CPC .......... *H01M 50/609* (2021.01); *B65G 47/80* (2013.01)

(58) Field of Classification Search
  CPC ............................ B65G 47/80; H01M 50/609
  See application file for complete search history.

(56) References Cited

U.S. PATENT DOCUMENTS 9,698,409 B2 *   7/2017  Watanabe ........... H01M 50/627

FOREIGN PATENT DOCUMENTS

| CN | 205452426 U | 8/2016 |
| CN | 108039447 A | 5/2018 |

(Continued)

OTHER PUBLICATIONS

International Search Report in the international application No. PCT/CN2024/113708, mailed on Nov. 23, 2024. 8 pages with English translation.

(Continued)

*Primary Examiner* — Timothy L Maust
(74) *Attorney, Agent, or Firm* — Anova Law Group, PLLC

(57) ABSTRACT

A liquid injection system includes a rotatable turnplate, a fixture, and a transfer device. Mounting regions are arranged on the turnplate at intervals in a circumferential direction of the turnplate. One of the turnplate and the fixture is provided with a plug-in slot, and the other is provided with a plug-in piece. The plug-in piece is in plug-in fit with the plug-in slot in a height direction of the fixture so that the fixture is detachably mounted in the mounting region. The fixture may move upward to be separated from the turnplate under the action of an external force, and the turnplate is rotated to drive the fixture to circulate in the circumferential direction of the turnplate. The transfer device includes a base and a jacking mechanism arranged on the base. The jacking mechanism is configured to drive the fixture to move in the height direction of the fixture.

19 Claims, 8 Drawing Sheets

(56) References Cited

FOREIGN PATENT DOCUMENTS

| | | | | |
|---|---|---|---|---|
| CN | 208616883 U | 3/2019 | | |
| CN | 111354918 A | 6/2020 | | |
| CN | 111933885 | * 9/2021 | .......... | H01M 50/609 |
| CN | 215184441 U | 12/2021 | | |
| CN | 115528393 A | 12/2022 | | |
| CN | 220702504 U | 4/2024 | | |
| KR | 20220021724 A | 2/2022 | | |

OTHER PUBLICATIONS

Written Opinion of the International Search Authority in the international application No. PCT/CN2024/113708, mailed on Nov. 23, 2024. 8 pages with English translation.

* cited by examiner

LIQUID INJECTION SYSTEM FOR BATTERY AND TRANSFER DEVICE THEREOF

CROSS-REFERENCE TO RELATED APPLICATIONS

The present application is a continuation of International Application No. PCT/CN2024/113708, filed on Aug. 21, 2024, which claims priority to Chinese Patent Application No. 202420148475.4 filed on Jan. 22, 2024 and entitled "LIQUID INJECTION SYSTEM FOR BATTERY AND TRANSFER DEVICE THEREOF", which are incorporated herein by reference in their entirety.

TECHNICAL FIELD

The present disclosure relates to the technical field of battery production equipment, in particular to a liquid injection system for a battery and a transfer device thereof.

BACKGROUND

This section is intended to provide a background or context to implementations of the present disclosure. It is not admitted that what is described here is prior art by virtue of its inclusion in this section.

An existing liquid injection system usually includes a transmission mechanism, a carrying mechanism and a liquid injection mechanism. The carrying mechanism is located on the transmission mechanism, the carrying mechanism is configured to carry a battery, and the transmission mechanism can drive the carrying mechanism to be transferred to different stations in sequence. In the related art, the carrying mechanism is fixed on the transmission mechanism, and when the carrying mechanism moves to loading and unloading stations and loading and unloading mechanical arms perform loading and unloading on the carrying mechanism, there is a problem of interference between the mechanical arms and the transmission mechanism, so loading and unloading are inconvenient.

SUMMARY

In view of this, the embodiments of the present disclosure are intended to provide a liquid injection system for a battery and a transfer device thereof, which can facilitate maintenance of the liquid injection system while facilitating loading and unloading.

To achieve the above objective, a first aspect of an embodiment of the present disclosure provides a liquid injection system for a battery, including:
a rotatable turnplate, where a plurality of mounting regions are arranged on the turnplate, and the mounting regions are arranged at intervals in a circumferential direction of the turnplate;
a fixture for carrying a battery, where one of the turnplate and the fixture is provided with a first plug-in slot, and the other is provided with a first plug-in piece, the first plug-in piece is in plug-in fit with the first plug-in slot in a height direction of the fixture, so that the fixture is detachably mounted to the mounting region, and the fixture can move upward under the action of an external force to be separated from the turnplate, and the turnplate is rotated to drive the fixture to circulate in the circumferential direction of the turnplate; and
a transfer device, including a base and a first jacking mechanism arranged on the base, where the first jacking mechanism is configured to drive the fixture to move in the height direction of the fixture so that the fixture is assembled to the turnplate or separated from the turnplate.

An embodiment of the present disclosure provides a liquid injection system for a battery, including a rotatable turnplate, a fixture for carrying a battery, and a transfer device. By detachably mounting the fixture to the mounting region of the turnplate, the battery may be loaded and unloaded by transferring the fixture to the outside of the turnplate, which is conducive to loading and unloading the battery (i.e., the battery is conveniently placed in or removed from a containing slot of the fixture), and interference between a mechanical arm and the turnplate during loading and unloading the battery may be prevented to a certain extent. In addition, since the fixture and the turnplate are detachably connected, it is also conducive to the maintenance of the fixture, thereby facilitating the maintenance of the liquid injection system, and making it convenient to maintain and change the fixture. Furthermore, the fixture and the turnplate are in plug-in fit through the first plug-in piece and the first plug-in slot. Whether it is assembly or disassembly, it only requires the fixture to move linearly in a plug-in direction or a direction opposite to the plug-in direction, a movement mode is single, rapid assembly and disassembly of the fixture and the turnplate may be implemented, the operation is convenient, the assembly efficiency of the fixture is improved, assembly cost is reduced better, and automatic machine operation is also better achieved. Moreover, the turnplate may be simplified, flexibility of the liquid injection system is improved, rapid change is convenient, each fixture may be maintained in turn, and labor intensity is reduced.

In some implementations, the first jacking mechanism is supported at the bottom of the fixture.

By supporting the first jacking mechanism at the bottom of the fixture, it is more conducive to the cooperation between the first jacking mechanism and the fixture, which is conducive to reducing a movement space required during the movement of the first jacking mechanism, and improving the compactness of the liquid injection system. For example, the first jacking mechanism does not need to be wrapped or supported on a side wall of the fixture, which can reduce a space required by a side surface of the fixture.

In some implementations, one of the first jacking mechanism and the fixture is provided with a second plug-in slot, and the other is provided with a second plug-in piece, and the second plug-in piece is in plug-in fit with the second plug-in slot in a height direction of the fixture.

In this embodiment, during assembly, the first jacking mechanism is plugged into the fixture from bottom to top, and thereafter, a self gravity of the fixture helps to make the fixture remain in a plug-in position. In addition, during a process that the first jacking mechanism drives the fixture to move in the height direction of the fixture, the self gravity of the fixture helps to make the fixture remain in the plug-in position. Therefore, even if the fixture is not limited from moving upward, the fixture may also remain in the plug-in position more reliably. In addition, the gravity of the fixture does not generate a component force, in a horizontal direction, on the fixture, which is conducive to improving the reliability of the fixture. The cooperation between the second plug-in piece and the second plug-in slot may limit a position of the fixture in the horizontal direction.

In some implementations, the turnplate includes a carrying member for carrying the fixture, the number of the first jacking mechanisms is two, and the two first jacking mechanisms are spaced apart and abut against the fixture to avoid the carrying member.

The number of the first jacking mechanisms is two, which are spaced apart and abut against the fixture to avoid the carrying member. For example, the two first jacking mechanisms abut against the bottom of the fixture respectively, which improves the cooperation stability between the first jacking mechanisms and the fixture. During assembly, the first jacking mechanisms may first move the fixture to a top of the carrying member, and then move the fixture from top to bottom so that the fixture and the base may be in plug-in fit through the first plug-in slot and the first plug-in piece. At this time, the carrying member is located between the two first jacking mechanisms, that is, a gap between the two first jacking mechanisms is configured to avoid the carrying member, or, in other words, the gap between the carrying member between adjacent mounting regions is configured to avoid the first jacking mechanisms.

In some implementations, the transfer device further includes a driving module and a battery loading and unloading station, the driving module is configured to drive the first jacking mechanism to move in a first direction, the battery loading and unloading station is arranged on a side of the transfer device away from the turnplate in the first direction, and the first jacking mechanism may move the fixture away from the battery loading and unloading station or transfer the fixture to the battery loading and unloading station, where the first direction is perpendicular to a height direction.

In this way, the fixture may be driven by the first jacking mechanism to move in the height direction of the fixture to separate the fixture from the turnplate, and then the fixture is driven by the driving module to move in the first direction so as to move the fixture to the battery loading and unloading station. The fixture is driven by the first jacking mechanism to move in the height direction of the fixture so as to assemble the fixture to the battery loading and unloading station. In other words, the fixture may be transferred by the transfer device to the battery loading and unloading station outside the turnplate and then load and unload the battery, which is conducive to the loading and unloading of the battery (that is, the battery is conveniently placed in or removed out of the containing slot of the fixture), and interference between the mechanical arm and the turnplate during loading and unloading the battery may be prevented to a certain extent. After the battery is re-loaded on the fixture, the fixture is driven by the first jacking mechanism to move in the height direction of the fixture to separate the fixture from the battery loading and unloading station, and then the fixture is driven by the driving module to move in the first direction so as to move the fixture onto the turnplate. The fixture is driven by the first jacking mechanism to move in the height direction of the fixture so as to assemble the fixture onto the turnplate.

In some implementations, one of the battery loading and unloading station and the fixture is provided with a third plug-in slot, the other is provided with a third plug-in piece, and the third plug-in piece is in plug-in fit with the third plug-in slot in the height direction of the fixture.

In this embodiment, during assembly, the fixture is plugged into the battery loading and unloading station from top to bottom. Thereafter, the self gravity of the fixture helps to make the fixture remain in the plug-in position. In addition, during a process that the battery loading and unloading station drives the fixture to rotate, the fixture is basically not subjected to an upward acting force. Therefore, even if the fixture is not limited from moving upward, the fixture may also remain in the plug-in position more reliably. In addition, the gravity of the fixture does not generate a component force, in a horizontal direction, on the fixture, which is conducive to improving the reliability of the fixture.

In some implementations, the first plug-in slot and the third plug-in slot are formed in the fixture and are the same plug-in slot in the fixture.

In this embodiment, the fixture is provided with the same plug-in slot to cooperate with the battery loading and unloading station or the turnplate respectively. That is to say, the battery loading and unloading station and the turnplate may share the plug-in slot in the fixture, so that the number of the plug-in slots in the fixture may be reduced, which is conducive to improving the processing efficiency of the fixture and improving the structural strength of the fixture.

In some implementations, the transfer device includes a second jacking mechanism arranged below the battery loading and unloading station, and the second jacking mechanism is configured to eject a battery in the fixture located on the battery loading and unloading station.

By arranging the second jacking mechanism which is configured to eject the battery in the fixture located on the battery loading and unloading station, that is, the second jacking mechanism is configured to eject the battery in the containing slot, it is conducive to clamping the battery by the mechanical arm, and thus facilitating the unloading of the battery.

In some implementations, a first avoidance slot is formed in the bottom of the fixture, and the battery loading and unloading station is provided with a second avoidance slot corresponding to the first avoidance slot. A push rod of the second jacking mechanism moves in the height direction of the fixture, extends into the fixture via the second avoidance slot and the first avoidance slot in sequence, and ejects the battery in the fixture.

The first avoidance slot is formed in the bottom of the fixture, and the second avoidance slot corresponding to the first avoidance slot is formed in the battery loading and unloading station, so that the push rod of the second jacking mechanism extends into the fixture via the second avoidance slot and the first avoidance slot in sequence, and ejects the battery in the fixture. The structure is simple and reliable.

In some implementations, the first avoidance slot extends in the first direction, and there are a plurality of first avoidance slots, all of which are arranged in a second direction, and the first direction intersects with the second direction.

By setting the number of the first avoidance slots to be multiple and arranging the first avoidance slots in the second direction, a plurality of batteries are ejected at the same time, which is conducive to improving the unloading efficiency of the batteries.

In some implementations, the first avoidance slots extend in the first direction, a plurality of push rods are in each of the first avoidance slots, and the push rods in the same first avoidance slot are arranged at intervals in the first direction.

By setting the number of push rods to be multiple, the push rods are arranged at intervals in the first direction, that is, the plurality of push rods may cooperate with the battery in the containing slot at the same time to eject the battery, and the battery may be ejected stably, which is further conducive to clamping the battery out by the mechanical arm.

In some implementations, the transfer device further includes an adjustment mechanism arranged between the battery loading and unloading station and the turnplate, and the adjustment mechanism is configured to adjust the battery on the fixture so that the battery is assembled in place.

By arranging the adjustment mechanism which is located between the battery loading and unloading station and the turnplate, it is conducive to shortening a moving distance of the first jacking mechanism and the driving module. The adjustment mechanism adjusts the battery on the fixture so that the battery is assembled in place, thus the liquid injection effect of the battery is improved, and then the quality of the battery is improved.

In some implementations, the adjustment mechanism includes a mounting bracket arranged on the base and an adjusting member arranged on the mounting bracket, an adjusting region is formed below the mounting bracket, the adjusting member corresponds one-to-one to the battery on the fixture, and moves in the height direction of the fixture to adjust the battery on the fixture located in the adjusting region.

The adjustment mechanism is configured to include the mounting bracket and the adjusting member, the adjusting region is formed below the mounting bracket, and the adjusting member moves in the height direction of the fixture to adjust the battery on the fixture located in the adjusting region, so that the battery is assembled in place. The structure is simple and reliable.

In some implementations, the transfer device further includes the mechanical arm configured to load and unload the fixture located on the battery loading and unloading station.

By arranging the mechanical arm which is configured to load and unload the fixture located on the battery loading and unloading station, it is conducive to achieving automatic machine operation and reducing labor cost.

In some implementations, the transfer device and the turnplate are of a split structure.

In this embodiment, the transfer device and the turnplate are conveniently machined separately, and the difficulty and cost of machining the transfer device and the turnplate are reduced. In addition, it is also conducive to maintaining the transfer device.

In some implementations, a fixture loading station, a vacuumizing station, a liquid injection station and a still standing station are sequentially arranged on a periphery of the turnplate in a circulation position of the fixture, and the transfer device is arranged on the fixture loading station.

When the battery is loaded and unloaded on a battery loading station and a battery unloading station, a vacuumizing mechanism and a liquid injection mechanism may perform vacuumizing and liquid injection operations on the vacuumizing station and liquid injection station corresponding to them, which saves time of waiting for a material on the vacuumizing station and the liquid injection station and improves the machining efficiency of the liquid injection system. Placing the vacuumizing station and the liquid injection station outside the turnplate is also conducive to the maintenance of gas, valves and other devices in the liquid injection system.

A second aspect of an embodiment of the present disclosure provides a transfer device, which is used as a constituting component of the above-mentioned liquid injection system.

According to the liquid injection system in the embodiment of the present disclosure, by detachably mounting the fixture to the mounting region of the turnplate, the battery may be loaded and unloaded by transferring the fixture to the outside of the turnplate, which is conducive to loading and unloading the battery (i.e., the battery is conveniently placed in or removed from the containing slot of the fixture), and interference between the mechanical arm and the turnplate during loading and unloading the battery may be prevented to a certain extent. In addition, since the fixture and the turnplate are detachably connected, it is also conducive to the maintenance of the fixture, thereby facilitating the maintenance of the liquid injection system, and making it convenient to maintain and change the fixture. Furthermore, the fixture and the turnplate are in plug-in fit through the first plug-in piece and the first plug-in slot. Whether it is assembly or disassembly, it only requires the fixture to move linearly in a plug-in direction or a direction opposite to the plug-in direction, a movement mode is single, rapid assembly and disassembly of the fixture and the turnplate may be implemented, the operation is convenient, the assembly efficiency of the fixture is improved, assembly cost is reduced better, and automatic machine operation is also better achieved. Moreover, the turnplate may be simplified, flexibility of the liquid injection system is improved, rapid change is convenient, each fixture may be maintained in turn, and labor intensity is reduced.

DESCRIPTION OF REFERENCE NUMERALS

Figure 1:
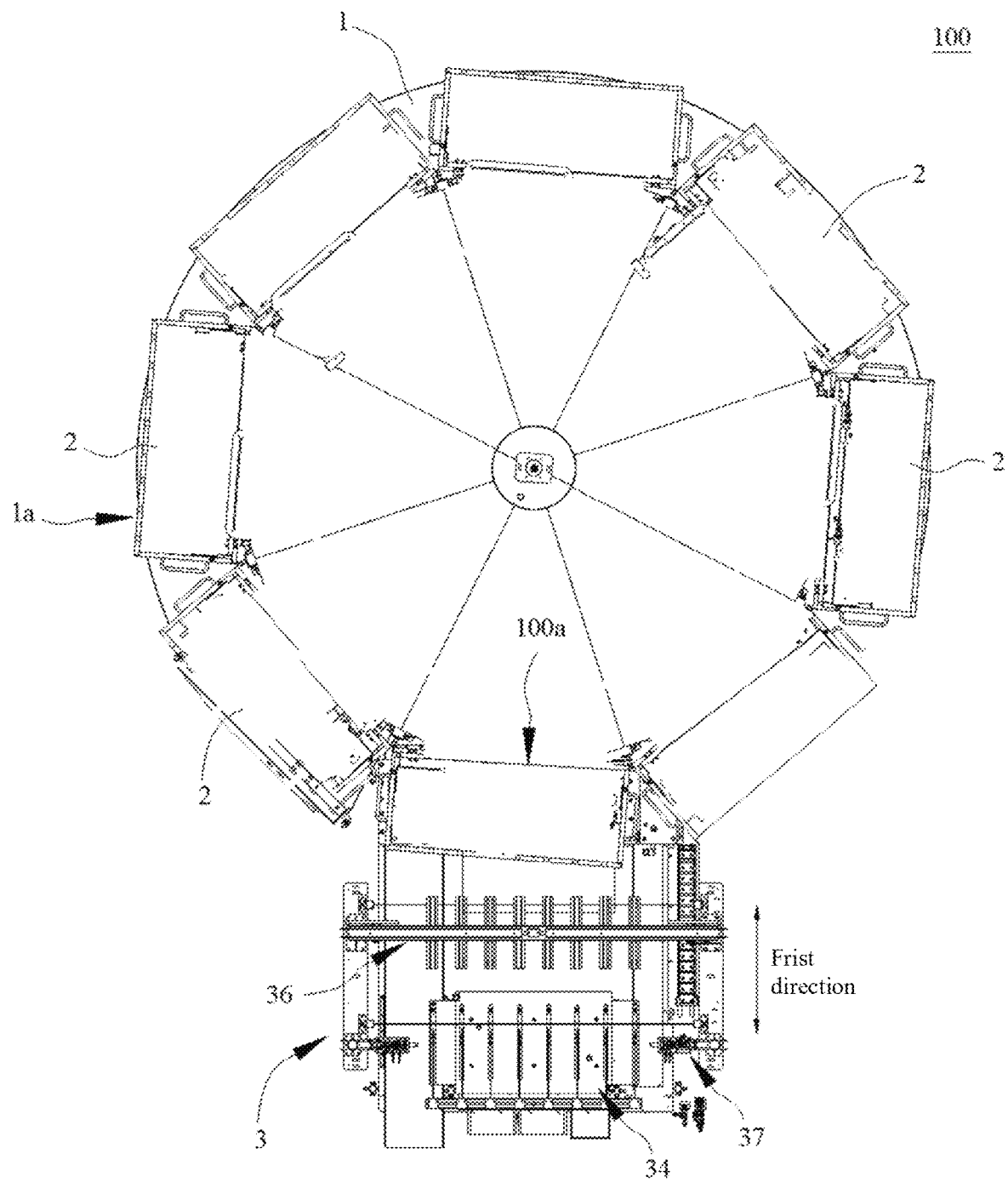
FIG. 1 is a schematic partial structural diagram of a liquid injection system at a first viewing angle according to an embodiment of the present disclosure.

1. Turnplate; 1a. Mounting region; 1b. Carrying member; 2. fixture; 2a. First plug-in slot; 2b. Second plug-in slot; 2c. Third plug-in slot; 2d. First avoidance slot; 2n. Containing slot; 3. Transfer device; 31. Base; 32. First jacking mechanism; 32a. Second plug-in piece; 33. Driving module; 34. Battery loading and unloading station; 34a. Third plug-in piece; 34b. Second avoidance slot; 35. Second jacking mechanism; 35a. Push rod; 36. Adjustment mechanism; 36a. Adjusting region; 361. Mounting bracket; 362. Adjusting member; 37. Mechanical arm; 100. liquid injection system; 100a. Fixture loading station; and 200. Battery.

DETAILED DESCRIPTION

It should be noted that, where there is no conflict, the embodiments in the present disclosure and the technical features in the embodiments may be combined with each other. The detailed descriptions in the Detailed Description section should be understood as interpretive explanations of the purpose of the present disclosure and should not be regarded as undue limitations on the present disclosure.

Unless otherwise defined, all technical and scientific terms used herein have the same meanings as commonly understood by those skilled in the art in the present application. The terms used herein are intended only for the purpose of describing specific embodiments and are not intended to limit the present disclosure. The terms "including" and "having" and any variants thereof in the present disclosure and in the description of drawings above are intended to cover non-exclusive inclusion.

In the description of the embodiments of the present disclosure, the technical terms "first", "second", "third", and the like are only used for distinguishing different objects, and cannot be understood as indicating or implying a relative importance or implicitly specifying the number, particular order, or primary and secondary relation of the technical features indicated. In the description of the embodiments of the present disclosure, "a plurality of" means two or more, unless otherwise explicitly and specifically defined.

The reference to "embodiments" herein means that specific features, structures or characteristics described in combination with the embodiments may be included in at least one embodiment of the present disclosure. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present disclosure, the term "and/or" is only an association relationship for describing associated objects, indicating that three relationships may exist. For example, A and/or B may indicate three situations: A exists alone, both A and B exist, and B exists alone. In addition, the character "/" herein generally means that the associated objects before and after it are in an "or" relationship.

In the description of the embodiments of the present disclosure, the technical terms "length", "width", "thickness", "upper", "lower", "front", "rear", "left", "right", "vertical", "horizontal", "top", "bottom", "inner", "outer", "circumferential," "height direction," "first direction," "second direction", and the like indicate orientations or positional relationships based on the orientations or positional relationships shown in the drawings, and are intended only to facilitate and simplify the description of the embodiments of the present disclosure, and are not intended to indicate or imply that the device or element referred to must have a particular orientation, or be constructed, operated, or used in a particular orientation, and therefore should not be construed as limitation of the embodiments of the present disclosure.

In the description of the embodiments of the present disclosure, unless otherwise explicitly specified and defined, the technical terms such as "mount", "connect", "connection" and "fix" should be understood in a broad sense. For example, the connection may be fixed connection, detachable connection or integrated connection, may be mechanical connection or electrical connection, or may be direct connection, indirect connection through an intermediate, internal communication between two elements or interaction relationship between two elements. For those of ordinary skill in the art, the specific meanings of the above terms in the embodiments of the present disclosure can be understood according to specific situations.

In the description of the embodiments of the present disclosure, unless otherwise explicitly specified and defined, the technical term "contact" should be understood in a broad sense, which may be direct contact, or contact through an intermediate layer, or contact between two objects that basically have no interaction force, or contact between two objects that have interaction force.

With the development of clean energy, more and more devices use electrical energy as driving energy, and thus power batteries that can store more electrical energy and can be charged and discharged multiple times have developed rapidly, such as a lithium-ion battery. Power batteries are not only applied in energy storage power source systems such as water, fire, wind, and solar power stations, but also widely applied in electric transportation tools, such as electric bicycles, electric motorcycles, and electric vehicles, as well as many fields, such as aerospace.

The battery mentioned in the embodiments of the present disclosure refers to a single physical module including one or more battery cells to provide a higher voltage and capacity. For example, the battery mentioned in the present disclosure may include a battery module, a battery pack, or the like. The battery generally includes a box for packaging one or more battery cells. The box may prevent liquid or other foreign matters from affecting charging or discharging of the battery cell.

In the present disclosure, the battery cell may include a lithium-ion secondary battery, a lithium-ion primary battery, a lithium-sulfur battery, a sodium lithium-ion battery, a sodium-ion battery, a magnesium-ion battery, or the like, which is not limited in the embodiments of the present disclosure. The battery cell may be cylindrical, cuboid, or in other shapes, which is not limited in the embodiments of the present disclosure.

The battery cell includes an electrode assembly and an electrolytic solution, and the electrode assembly is composed of a positive electrode plate, a negative electrode plate, and a separator. The battery cell operates mainly relying on movement of metal ions between the positive electrode plate and the negative electrode plate. The positive electrode plate includes a positive electrode current collector and a positive electrode active material layer, the positive electrode active material layer is coated on a surface of the positive electrode current collector, the positive electrode current collector which is not coated with the positive electrode active material layer protrudes from the positive electrode current collector coated with the positive electrode active material layer, and the positive electrode current collector which is not coated with the positive electrode active material layer is used as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer. A surface of the negative electrode current collector is coated with the negative electrode active material layer. The parts, not coated with the negative electrode active material layer, of the negative electrode current collector protrude from the part, coated with the negative electrode active material layer, of the negative electrode current collector, and the parts, not coated with the negative electrode active material layer, of the negative electrode current collector serve as negative tabs. The material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. The material of the separator may be polypropylene (PP), polyethylene (PE) or the like.

The battery cell further includes an insulating film and a housing. The insulating film covers the outside of the electrode assembly. The housing encapsulates the electrode assembly covered with the insulating film to form the battery cell. The insulating film may be a mylar film, and the housing may be an aluminum housing. After the electrode assembly is rolled and formed, the mylar film and the housing are packaged through a Mylar wrapping process and a shelling process. The mylar film plays the role of sealing and protecting the electrode assembly, and can effectively insulate the electrode assembly from the housing to avoid short circuit within the battery cell. The housing plays a protective role.

A liquid injection process is an important step in the battery manufacturing process. The liquid injection accuracy is directly related to the cycle performance and consistency of lithium ions.

In the related art, since the fixture is fixed on a turnplate, when the fixture moves to a loading and unloading station and is loaded and unloaded by a loading and unloading mechanical arm, there is an interference problem between the mechanical arm and the turnplate, so loading and unloading are inconvenient.

For convenient loading and unloading, an embodiment of the present disclosure provides a liquid injection system for a battery. The liquid injection system includes a rotatable turnplate, a fixture for carrying a battery and a transfer device. A plurality of mounting regions are arranged on the turnplate, and the mounting regions are arranged at intervals in a circumferential direction of the turnplate. One of the turnplate and the fixture is provided with a first plug-in slot, and the other is provided with a first plug-in piece. The first plug-in piece is in plug-in fit with the first plug-in slot in a height direction of the fixture so that the fixture is detachably mounted in the mounting region. The fixture may move upward to be separate from the turnplate under the action of an external force, and the turnplate rotates so as to drive the fixture to circulate in the circumferential direction of the turnplate. The transfer device includes a base and a first jacking mechanism arranged on the base. The first jacking mechanism is configured to drive the fixture to move in the height direction of the fixture so that the fixture is assembled to the turnplate or separated from the turnplate.

The liquid injection system includes the rotatable turnplate, the fixture for carrying the battery and the transfer device. By detachably mounting the fixture to the mounting region of the turnplate, the battery may be loaded and unloaded by transferring the fixture to the outside of the turnplate, which is conducive to loading and unloading the battery (i.e., the battery is conveniently placed in or removed from a containing slot of the fixture), and interference between a mechanical arm and the turnplate during loading and unloading the battery may be prevented to a certain extent. In addition, since the fixture and the turnplate are detachably connected, it is also conducive to the maintenance of the fixture, thereby facilitating the maintenance of the liquid injection system, and making it convenient to maintain and change the fixture. Furthermore, the fixture and the turnplate are in plug-in fit through the first plug-in piece and the first plug-in slot. Whether it is assembly or disassembly, it only requires the fixture to move linearly in a plug-in direction or a direction opposite to the plug-in direction, a movement mode is single, rapid assembly and disassembly of the fixture and the turnplate may be implemented, the operation is convenient, the assembly efficiency of the fixture is improved, assembly cost is reduced better, and automatic machine operation is also better achieved. Moreover, the turnplate may be simplified, flexibility of the liquid injection system is improved, rapid change is convenient, each fixture may be maintained in turn, and labor intensity is reduced.

Please refer to FIG. 1 to FIG. 8. The embodiment of the present disclosure further provides a transfer device 3. The transfer device 3 is used as a constituting component of the liquid injection system 100 of any embodiment of the present disclosure.

The transfer device 3 includes a base 31 and a first jacking mechanism 32 arranged on the base 31. The first jacking mechanism 32 is configured to drive the fixture 2 to move in the height direction of the fixture 2 so that the fixture 2 is assembled to the turnplate 1 or separated from the turnplate 1. In this way, it is conducive to achieving automatic machine operation.

An embodiment of the present disclosure provides the liquid injection system 100 of the battery 200. The liquid injection system 100 includes the rotatable turnplate 1, the fixture 2 for carrying the battery 200 and the transfer device 3. A plurality of mounting regions 1a are arranged on the turnplate 1, and the mounting regions 1a are arranged at intervals in the circumferential direction of the turnplate 1. One of the turnplate 1 and the fixture 2 is provided with a first plug-in slot 2a, and the other is provided with a first plug-in piece. The first plug-in piece is in plug-in fit with the first plug-in slot 2a in the height direction of the fixture 2 so that the fixture 2 is detachably mounted in the mounting region 1a. The fixture 2 may move upward to be separate from the turnplate 1 under the action of an external force, and the turnplate 1 rotates so as to drive the fixture 2 to circulate in the circumferential direction of the turnplate 1. The transfer device 3 includes a base 31 and a first jacking mechanism 32 arranged on the base 31. The first jacking mechanism 32 is configured to drive the fixture 2 to move in the height direction of the fixture 2 so that the fixture 2 is assembled to the turnplate 1 or separated from the turnplate 1.

The rotatable turnplate 1 means that the turnplate 1 can self-rotate under the action of an external force.

Figure 2:
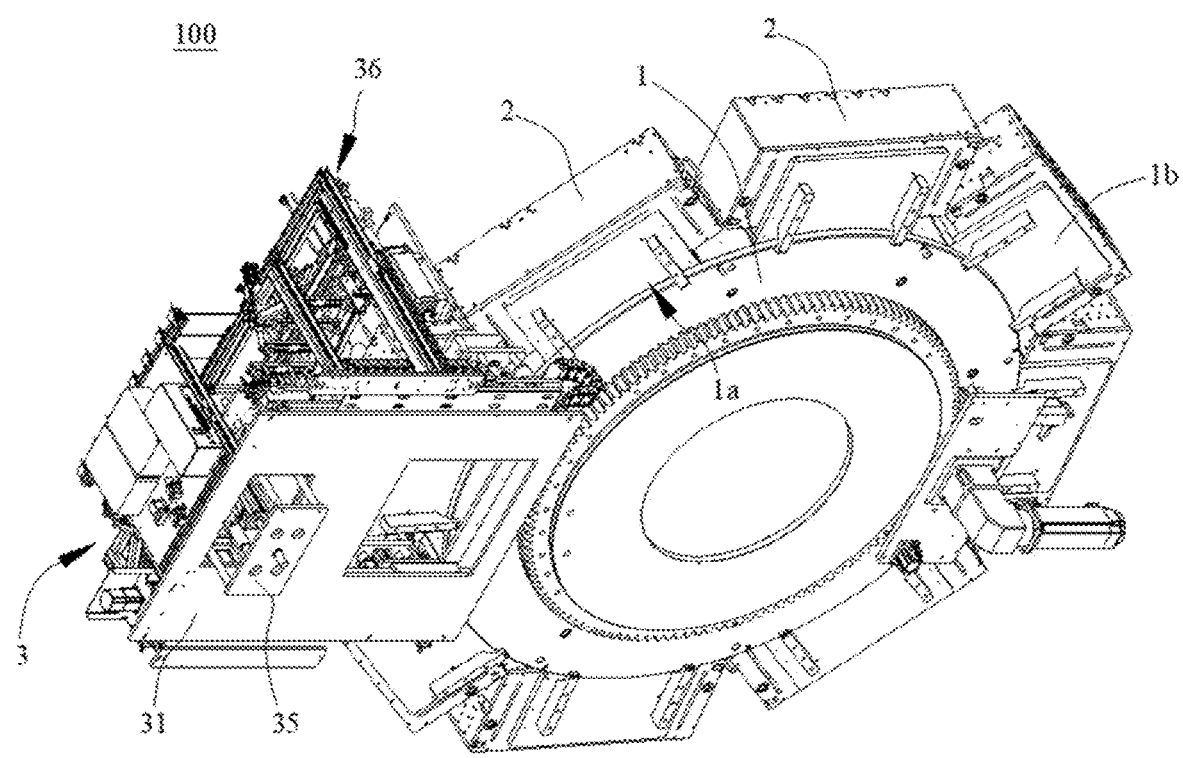
FIG. 2 is a schematic partial structural diagram of a liquid injection system at a second viewing angle according to an embodiment of the present disclosure.

Please refer to FIGS. 1 and 2, a plurality of mounting regions 1a are arranged on the turnplate 1. The mounting regions 1a are arranged at intervals in the circumferential direction of the turnplate 1. The mounting regions 1a are configured to mount the fixture 2 so as to perform steps such as vacuumizing, liquid injection and still standing on the battery 200 on the fixture 2. The mounting regions 1a are arranged at intervals in the circumferential direction of the turnplate 1. In this way, the turnplate 1 may rotate so as to drive the fixture 2 in the mounting region 1a to circulate in the circumferential direction of the turnplate 1 to perform different steps and finally complete the liquid injection.

It needs to be noted that the "a plurality of" mentioned in the embodiment of the present disclosure refers to a number of two or more than two.

Figure 8:
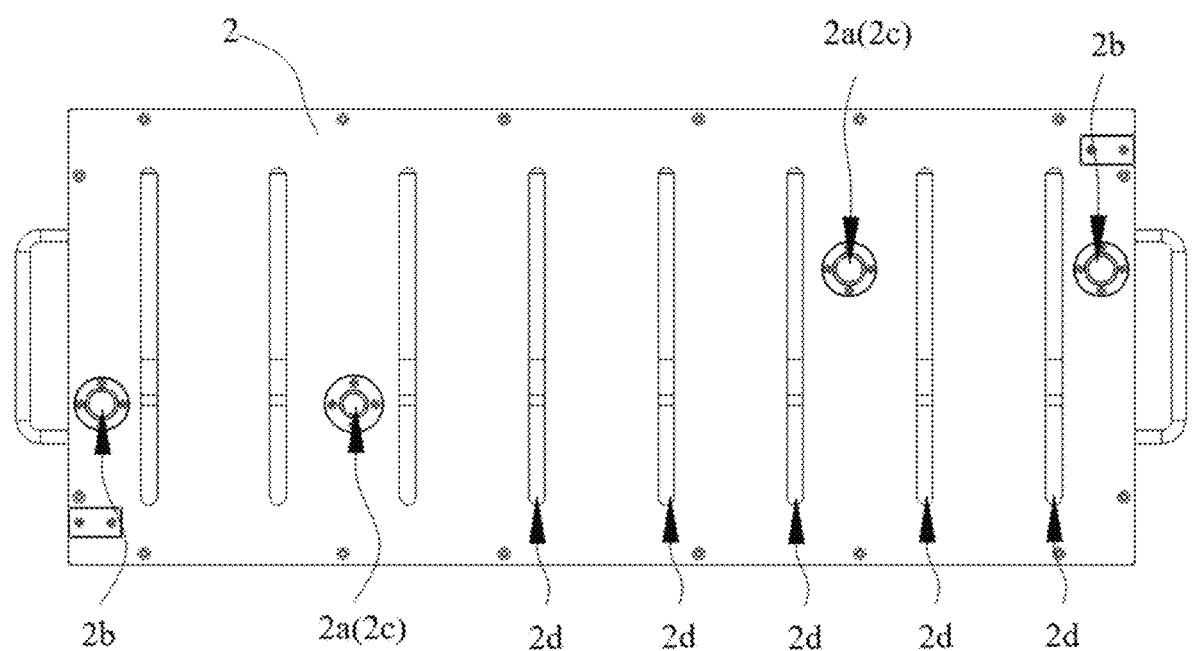
FIG. 8 is a schematic structural diagram of a fixture according to an embodiment of the present disclosure.

Please refer to FIG. 1, FIG. 2 and FIG. 8, one of the turnplate 1 and the fixture 2 is provided with a first plug-in slot 2a, and the other is provided with a first plug-in piece (not shown in the figures). The first plug-in piece is in plug-in fit with the first plug-in slot 2a in the height direction of the fixture 2 so that the fixture 2 is detachably mounted in the mounting region 1a.

The fixture 2 refers to a structure for carrying the battery 200. During a process of liquid injection, a containing slot 2n of the fixture 2 is configured to carry the battery 200, and different mechanisms of the liquid injection system 100 perform different treatments on the battery 200. Different batteries 200 may require different fixtures 2, and thus, different fixtures 2 may be replaced for carrying the batteries 200 for different types of batteries 200.

It needs to be noted that one of the turnplate 1 and the fixture 2 is provided with the first plug-in slot 2a, and the other is provided with the first plug-in piece, which means that the turnplate 1 may be provided with the first plug-in piece, and the fixture 2 may be provided with the first plug-in slot 2a. Alternatively, the turnplate 1 may be provided with the first plug-in slot 2a, and the fixture 2 may be provided with the first plug-in piece.

Certainly, in other implementations, the turnplate 1 may be provided with the first plug-in piece and the first plug-in slot 2a, the fixture 2 may also be provided with the first plug-in piece and the first plug-in slot 2a, the first plug-in piece on the fixture 2 may be in plug-in fit with the first plug-in slot 2a on the turnplate 1, and the first plug-in slot 2a on the fixture 2 may be in plug-in fit with the first plug-in piece on the turnplate 1.

It needs to be noted that after the first plug-in piece is in plug-in fit with the first plug-in slot 2a, the first plug-in piece cannot rotate relative to the first plug-in slot 2a, and in the absence of other acting force acting on the fixture 2, the fixture 2 may remain in a plug-in position.

Exemplarily, the first plug-in piece is in plug-in fit with the first plug-in slot 2a in the height direction of the fixture 2, and the fixture 2 may move upward to be separate from the turnplate 1 under the action of an external force. In this embodiment, during assembly, the fixture 2 is plugged into the turnplate 1 from top to bottom. Thereafter, the self gravity of the fixture 2 helps to make the fixture 2 remain in the plug-in position. In addition, during a process that the turnplate 1 drives the fixture 2 to rotate, the fixture 2 is basically not subjected to an upward acting force. Therefore, even if the fixture 2 is not limited from moving upward, the fixture 2 may also remain in the plug-in position more reliably. In addition, the gravity of the fixture 2 does not generate a component force, in a horizontal direction, on the fixture 2, which is conducive to improving the reliability of the fixture 2.

It needs to be noted that referring to FIG. 2 to FIG. 5, the transfer device 3 includes a base 31 and a first jacking mechanism 32 arranged on the base 31. The first jacking mechanism 32 is configured to drive the fixture 2 to move in the height direction of the fixture 2 so that the fixture 2 is assembled to the turnplate 1 or separated from the turnplate 1. That is to say, an upward acting force may be applied to the fixture 2 by the first jacking mechanism 32 of the transfer device 3 so that the fixture 2 moves in the height direction of the fixture 2 to be separated from the turnplate 1. During assembly, the first jacking mechanism 32 plugs the fixture 2 into the turnplate 1 from top to bottom. Thereafter, the self gravity of the fixture 2 is conducive to making the fixture 2 remain in the plug-in position, which is conducive to achieving the automatic machine operation.

In some embodiments, the first plug-in slot 2a is similar to a mortise, a structure of the first plug-in piece is similar to a tenon, and a matching relationship between the first plug-in slot 2a and the first plug-in piece is similar to a mortise and tenon structure. In this way, there is no need for fasteners such as screws to connect, and the turnplate 1 and the fixture 2 may be in plug-in fit reliably through the mortise and tenon structure.

An embodiment of the present disclosure provides the liquid injection system 100 of the battery 200. The liquid injection system 100 includes the rotatable turnplate 1, the fixture 2 for carrying the battery 200 and the transfer device 3. By detachably mounting the fixture 2 to the mounting region 1a of the turnplate 1, the battery 200 may be loaded and unloaded by transferring the fixture 2 to the outside of the turnplate 1, which is conducive to loading and unloading the battery 200 (i.e., the battery 200 is conveniently placed in or removed from the containing slot 2n of the fixture 2), and interference between the mechanical arm 37 and the turnplate 1 during loading and unloading the battery 200 may be avoided to a certain extent. In addition, since the fixture 2 and the turnplate 1 are detachably connected, it is also conducive to the maintenance of the fixture 2, thereby facilitating the maintenance of the liquid injection system 100, and making it convenient to maintain and change the fixture 2. Furthermore, the fixture 2 and the turnplate 1 are in plug-in fit through the first plug-in piece and the first plug-in slot 2a. Whether it is assembly or disassembly, it only requires the fixture 2 to move linearly in a plug-in direction or a direction opposite to the plug-in direction, the movement mode is single, rapid assembly and disassembly of the fixture 2 and the turnplate 1 may be implemented, the operation is convenient, the assembly efficiency of the fixture 2 is improved, assembly cost is reduced better, and automation machine operation is achieved better. Moreover, the turnplate 1 may be simplified, the flexibility of the liquid injection system 100 can be improved, and rapid change is convenient. Each fixture 2 may be maintained in turn, and labor intensity is reduced.

It needs to be noted that the specific matching relationship between the first jacking mechanism 32 and the fixture 2 is not limited here, as long as the fixture 2 can be driven to move along the height direction of the fixture 2.

In some embodiments, the first jacking mechanism 32 is supported at the bottom of the fixture 2.

By supporting the first jacking mechanism 32 at the bottom of the fixture 2, it is more conducive to the cooperation between the first jacking mechanism 32 and the fixture 2, and is conducive to reducing a movement space required during a movement of the first jacking mechanism 32, and improving the compactness of the liquid injection system 100. For example, the first jacking mechanism 32 does not need to be wrapped or supported on a side wall of the fixture 2, which may reduce a space required by a side surface of the fixture 2.

In some more specific embodiments, the turnplate 1 includes a carrying member 1b for carrying the fixture 2. The number of the first jacking mechanisms 32 is two. The two first jacking mechanisms 32 are spaced apart and abut against the fixture 2 to avoid the carrying member 1b.

The turnplate 1 includes the carrying member 1b for carrying the fixture 2, and the carrying members 1b are arranged at intervals between the adjacent mounting regions 1a.

The number of the first jacking mechanisms 32 is two, which are spaced apart and abut against the fixture 2 to avoid the carrying member 1b. For example, the two first jacking mechanisms 32 abut against the bottom of the fixture 2 respectively, which improves the cooperation stability between the first jacking mechanisms 32 and the fixture 2.

During assembly, the first jacking mechanisms 32 may first move the fixture 2 to a top of the carrying member 1b, and then move the fixture 2 from top to bottom so that the fixture 2 and the base may be in plug-in fit through the first plug-in slot 2a and the first plug-in piece. At this time, the carrying member 1b is located between the two first jacking mechanisms 32, that is, a gap between the two first jacking mechanisms 32 is configured to avoid the carrying member 1b, or, in other words, the gap between the carrying member 1b between adjacent mounting regions 1a is configured to avoid the first jacking mechanisms 32.

In some other more specific embodiments, the turnplate 1 includes the carrying members 1b for carrying the fixture 2, the number of the carrying members 1b is two, the number of the first jacking mechanisms 32 is one, and the two carrying members 1b are spaced apart to avoid the first jacking mechanism 32. The first jacking mechanism 32 abuts against a middle of the fixture 2.

In some embodiments, referring to FIG. 3 to FIG. 5 and FIG. 8, one of the first jacking mechanism 32 and the fixture 2 is provided with a second plug-in slot 2b, and the other is provided with a second plug-in piece 32a, and the second plug-in piece 32a is in plug-in fit with the second plug-in slot 2b in the height direction of the fixture 2.

It needs to be noted that one of the first jacking mechanism 32 and the fixture 2 is provided with the second plug-in slot 2b, and the other is provided with the second plug-in piece 32a, which means that the first jacking mechanism 32 is provided with the second plug-in piece 32a, and the fixture 2 is provided with the second plug-in slot 2b. Alternatively, the first jacking mechanism 32 may be provided with the second plug-in slot 2b, and the fixture 2 may be provided with the second plug-in piece 32a.

Certainly, in other implementations, the first jacking mechanism 32 may be provided with the second plug-in piece 32a and the second plug-in slot 2b, and the fixture 2 may also be provided with the second plug-in piece 32a and the second plug-in slot 2b, and the second plug-in piece 32a on the fixture 2 may be in plug-in fit with the second plug-in slot 2b on the first jacking mechanism 32, and the second plug-in slot 2b on the fixture 2 may be in plug-in fit with the second plug-in piece 32a on the first jacking mechanism 32.

It needs to be noted that after the second plug-in piece 32a is in plug-in fit with the second plug-in slot 2b, the second plug-in piece 32a cannot rotate relative to the second plug-in slot 2b, and in the absence of other acting force acting on the fixture 2, the fixture 2 may remain in the plug-in position.

Exemplarily, the second plug-in piece 32a is in plug-in fit with the second plug-in slot 2b in the height direction of the fixture 2. In this embodiment, during assembly, the first jacking mechanism 32 is plugged into the fixture 2 from bottom to top, and thereafter, a self gravity of the fixture 2 helps to make the fixture 2 remain in the plug-in position. In addition, during a process that the first jacking mechanism 32 drives the fixture 2 to move in the height direction of the fixture 2, the self gravity of the fixture 2 helps to make the fixture 2 remain in the plug-in position. Therefore, even if the fixture 2 is not limited from moving upward, the fixture 2 may also remain in the plug-in position more reliably. In addition, the gravity of the fixture 2 does not generate a component force, in a horizontal direction, on the fixture 2, which is conducive to improving the reliability of the fixture 2. The cooperation between the second plug-in piece 32a and the second plug-in slot 2b may limit a position of the fixture 2 in the horizontal direction.

In some embodiments, the second plug-in slot 2b is similar to a mortise, a structure of the second plug-in piece 32a is similar to a tenon, and a matching relationship between the second plug-in slot 2b and the second plug-in piece 32a is similar to a mortise and tenon structure. In this way, there is no need for fasteners such as screws to connect, and the first jacking mechanism 32 and the fixture 2 may be in plug-in fit reliably through the mortise and tenon structure.

In some embodiments, referring to FIG. 1 to FIG. 5, the transfer device 3 further includes a driving module 33 and a battery loading and unloading station 34, the driving module 33 is configured to drive the first jacking mechanism 32 to move in the first direction, the battery loading and unloading station 34 is arranged on a side of the transfer device 3 away from the turnplate 1 in the first direction, the first jacking mechanism 32 may move the fixture 2 away from the battery loading and unloading station 34 or transfer the fixture 2 to the battery loading and unloading station 34, where the first direction is perpendicular to the height direction.

The specific type of the drive module 33 is not limited here, for example, it may be a rotating motor screw nut structure, or a linear motor driving structure with an iron core, or a linear motor driving structure without an iron core, or a voice coil motor driving structure, or other drive forms.

The battery loading and unloading station 34 is configured to load and unload the battery 200.

The battery loading and unloading station 34 is arranged on the side of the transfer device 3 away from the turnplate 1 in the first direction. The driving module 33 is configured to drive the first jacking mechanism 32 to move in the first direction, that is, to drive the fixture 2 to move between the turnplate 1 and the battery loading and unloading station 34.

The first jacking mechanism 32 may move the fixture 2 away from the battery loading and unloading station 34 or transfer the fixture 2 to the battery loading and unloading station 34. The first jacking mechanism 32 drives the fixture 2 to move in the height direction of the fixture 2 so that the fixture 2 is assembled to the battery loading and unloading station 34 or separated from the battery loading and unloading station 34.

The transfer device 3 is provided with the driving module 33 and the battery loading and unloading station 34, the driving module 33 is configured to drive the fixture 2 to move between the turnplate 1 and the battery loading and unloading station 34, in this way, the fixture 2 may be driven by the first jacking mechanism 32 to move in the height direction of the fixture 2 to separate the fixture 2 from the turnplate 1, and then the fixture 2 is driven by the driving module 33 to move in the first direction so as to move the fixture 2 to the battery loading and unloading station 34. The fixture 2 is driven by the first jacking mechanism 32 to move in the height direction of the fixture 2 so as to assemble the fixture 2 to the battery loading and unloading station 34. In other words, the fixture 2 may be transferred by the transfer device 3 to the battery loading and unloading station 34 outside the turnplate 1 and then load and unload the battery 200, which is conducive to the loading and unloading of the battery 200 (that is, the battery 200 is conveniently placed in or removed out of the containing slot 2n of the fixture 2), and interference between the mechanical arm 37 and the turnplate 1 during loading and unloading the battery 200 may be prevented to a certain extent. After the battery 200 is re-loaded on the fixture 2, the fixture 2 is driven by the first jacking mechanism 32 to move in the height direction of the fixture 2 to separate the fixture 2 from the battery loading and unloading station 34, and then the fixture 2 is driven by the driving module 33 to move in the first direction so as to move the fixture 2 onto the turnplate 1. The fixture 2 is driven by the first jacking mechanism 32 to move in the height direction of the fixture 2 so as to assemble the fixture 2 onto the turnplate 1.

In some embodiments, referring to FIG. 3 to FIG. 5 and FIG. 8, one of the battery loading and unloading station 34 and the fixture 2 is provided with a third plug-in slot 2c, the other is provided with a third plug-in piece 34a, and the third plug-in piece 34a is in plug-in fit with the third plug-in slot 2c in the height direction of the fixture 2.

It needs to be noted that one of the battery loading and unloading station 34 and the fixture 2 is provided with the third plug-in slot 2c, and the other is provided with the third plug-in piece 34a, which means that the battery loading and unloading station 34 is provided with the third plug-in piece 34a, and the fixture 2 is provided with the third plug-in slot 2c. Alternatively, the battery loading and unloading station 34 may be provided with the third plug-in slot 2c, and the fixture 2 may be provided with the third plug-in piece 34a.

Certainly, in other implementations, the battery loading and unloading station 34 may be provided with the third plug-in piece 34a and the third plug-in slot 2c, the fixture 2 may also be provided with the third plug-in piece 34a and the third plug-in slot 2c, the third plug-in piece 34a on the fixture 2 may be in plug-in fit with the third plug-in slot 2c on the battery loading and unloading station 34, and the third plug-in slot 2c on the fixture 2 may be in plug-in fit with the third plug-in piece 34a on the battery loading and unloading station 34.

It needs to be noted that after the third plug-in piece 34a is in plug-in fit with the third plug-in slot 2c, the third plug-in piece 34a cannot rotate relative to the third plug-in slot 2c, and in the absence of other acting force acting on the fixture 2, the fixture 2 may remain in the plug-in position.

Exemplarily, the third plug-in piece 34a is in plug-in fit with the third plug-in slot 2c in the height direction of the fixture 2, and the fixture 2 may move upward to be separate from the battery loading and unloading station 34 under the action of an external force. In this embodiment, during assembly, the fixture 2 is plugged into the battery loading and unloading station 34 from top to bottom. Thereafter, the self gravity of the fixture 2 helps to make the fixture 2 remain in the plug-in position. In addition, during a process that the battery loading and unloading station 34 drives the fixture 2 to rotate, the fixture 2 is basically not subjected to an upward acting force. Therefore, even if the fixture 2 is not limited from moving upward, the fixture 2 may also remain in the plug-in position more reliably. In addition, the gravity of the fixture 2 does not generate a component force, in a horizontal direction, on the fixture 2, which is conducive to improving the reliability of the fixture 2.

It needs to be noted that the transfer device 3 includes the base 31 and the first jacking mechanism 32 arranged on the base 31. The first jacking mechanism 32 is configured to drive the fixture 2 to move in the height direction of the fixture 2 so that the fixture 2 is assembled to the battery loading and unloading station 34 or separated from the battery loading and unloading station 34. That is to say, an upward acting force may be applied to the fixture 2 by the first jacking mechanism 32 of the transfer device 3 so that the fixture 2 moves in the height direction of the fixture 2 to be separated from the battery loading and unloading station 34. During assembly, the first jacking mechanism 32 plugs the fixture 2 into the battery loading and unloading station 34 from top to bottom. Thereafter, the self gravity of the fixture 2 is conducive to making the fixture 2 remain in the plug-in position, which is conducive to achieving the automatic machine operation.

In some embodiments, the third plug-in slot 2c is similar to a mortise, a structure of the third plug-in piece 34a is similar to a tenon, and a matching relationship between the third plug-in slot 2c and the third plug-in piece 34a is similar to a mortise and tenon structure. In this way, there is no need for fasteners such as screws to connect, and the battery loading and unloading station 34 and the fixture 2 may be in plug-in fit reliably through the mortise and tenon structure.

It may be understood that the fixture 2 may be provided with different plug-in slots to cooperate with the battery loading and unloading station 34 and the turnplate 1 respectively, or the fixture may also be provided with the same plug-in slot to cooperate with the battery loading and unloading station 34 or the turnplate 1 respectively.

In some embodiments, please refer to FIG. 8, the first plug-in slot 2a and the third plug-in slot 2c are formed in the fixture 2, and are the same plug-in slot in the fixture 2.

In this embodiment, the fixture 2 is provided with the same plug-in slot to cooperate with the battery loading and unloading station 34 or the turnplate 1 respectively. That is to say, the battery loading and unloading station 34 and the turnplate 1 may share the plug-in slot in the fixture 2, so that the number of the plug-in slots in the fixture 2 may be reduced, which is conducive to improving the processing efficiency of the fixture 2 and improving the structural strength of the fixture 2.

Figure 6:
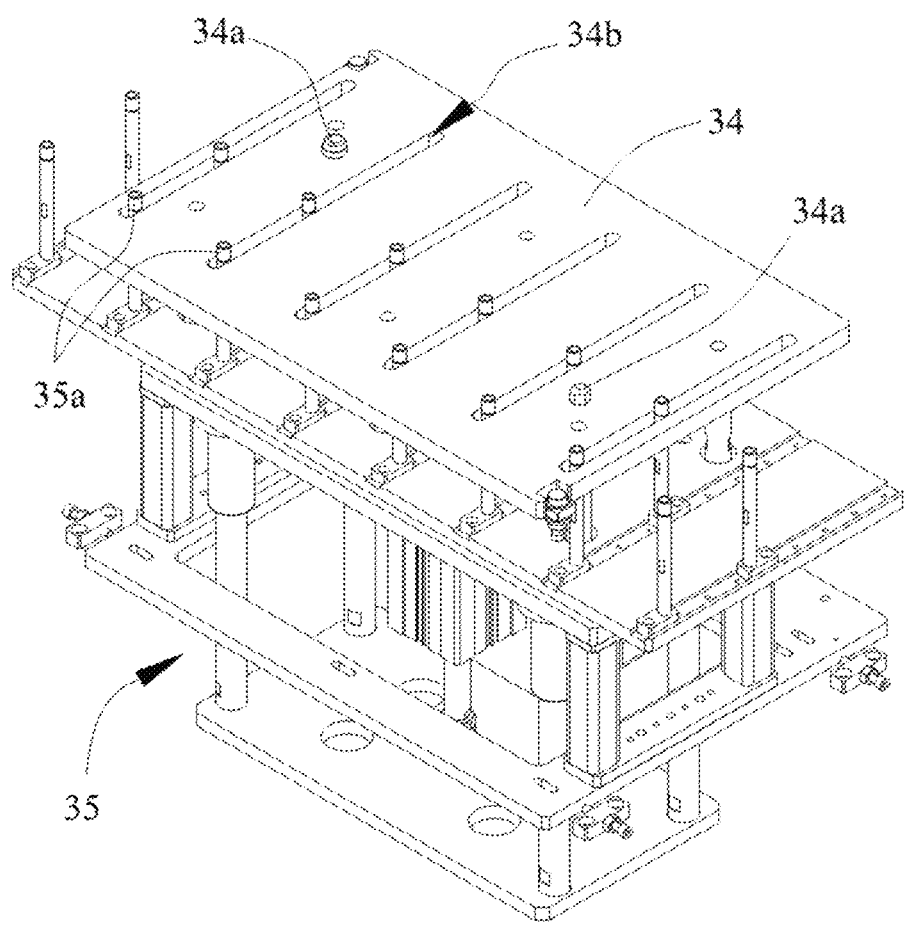
FIG. 6 is a schematic structural diagram of a second jacking mechanism and a battery loading and unloading station according to an embodiment of the present disclosure.

In some embodiments, referring to FIG. 3 to FIG. 4 and FIG. 6, the transfer device 3 includes a second jacking mechanism 35 arranged below the battery loading and unloading station 34, and the second jacking mechanism 35 is configured to eject the battery 200 in the fixture 2 located on the battery loading and unloading station 34.

It may be understood that the battery 200 is accommodated in the containing slot 2n of the fixture 2, and the fixture 2 plays a role in protecting the battery 200 and is conducive to transferring the battery 200.

By arranging the second jacking mechanism 35 which is configured to eject the battery 200 in the fixture 2 located on the battery loading and unloading station 34, that is, the second jacking mechanism 35 is configured to eject the battery 200 in the containing slot 2n, it is conducive to clamping the battery 200 by the mechanical arm 37, and thus facilitating the unloading of the battery 200.

It needs to be noted that there are many specific ways for the second jacking mechanism 35 to cooperate with the fixture 2 to eject the battery 200, which are not limited here.

Exemplarily, a first avoidance slot 2d is formed in the bottom of the fixture 2, and the battery loading and unloading station 34 is provided with a second avoidance slot 34b corresponding to the first avoidance slot 2d. A push rod 35a of the second jacking mechanism 35 moves in the height direction of the fixture 2, extends into the fixture 2 via the second avoidance slot 34b and the first avoidance slot 2d in sequence, and ejects the battery 200 in the fixture 2.

The first avoidance slot 2d is formed in the bottom of the fixture 2, that is, the first avoidance slot 2d is formed in the bottom of the containing slot 2n, for allowing the push rod 35a to extend into the containing slot 2n via the first avoidance slot 2d to eject the battery 200 in the containing slot 2n.

The battery loading and unloading station 34 is provided with a second avoidance slot 34b corresponding to the first avoidance slot 2d, that is, the first avoidance slot 2d corresponds to the second avoidance slot 34b one by one, for allowing the push rod 35a to pass through the battery loading and unloading station 34 via the second avoidance slot 34b, and then extend into the containing slot 2n via the first avoidance slot 2d, so as to eject the battery 200 in the containing slot 2n.

The first avoidance slot 2d is formed in the bottom of the fixture 2, and the second avoidance slot 34b corresponding to the first avoidance slot 2d is formed in the battery loading and unloading station 34, so that the push rod 35a of the second jacking mechanism 35 extends into the fixture 2 via the second avoidance slot 34b and the first avoidance slot 2d in sequence, and ejects the battery 200 in the fixture 2. The structure is simple and reliable.

Figure 4:
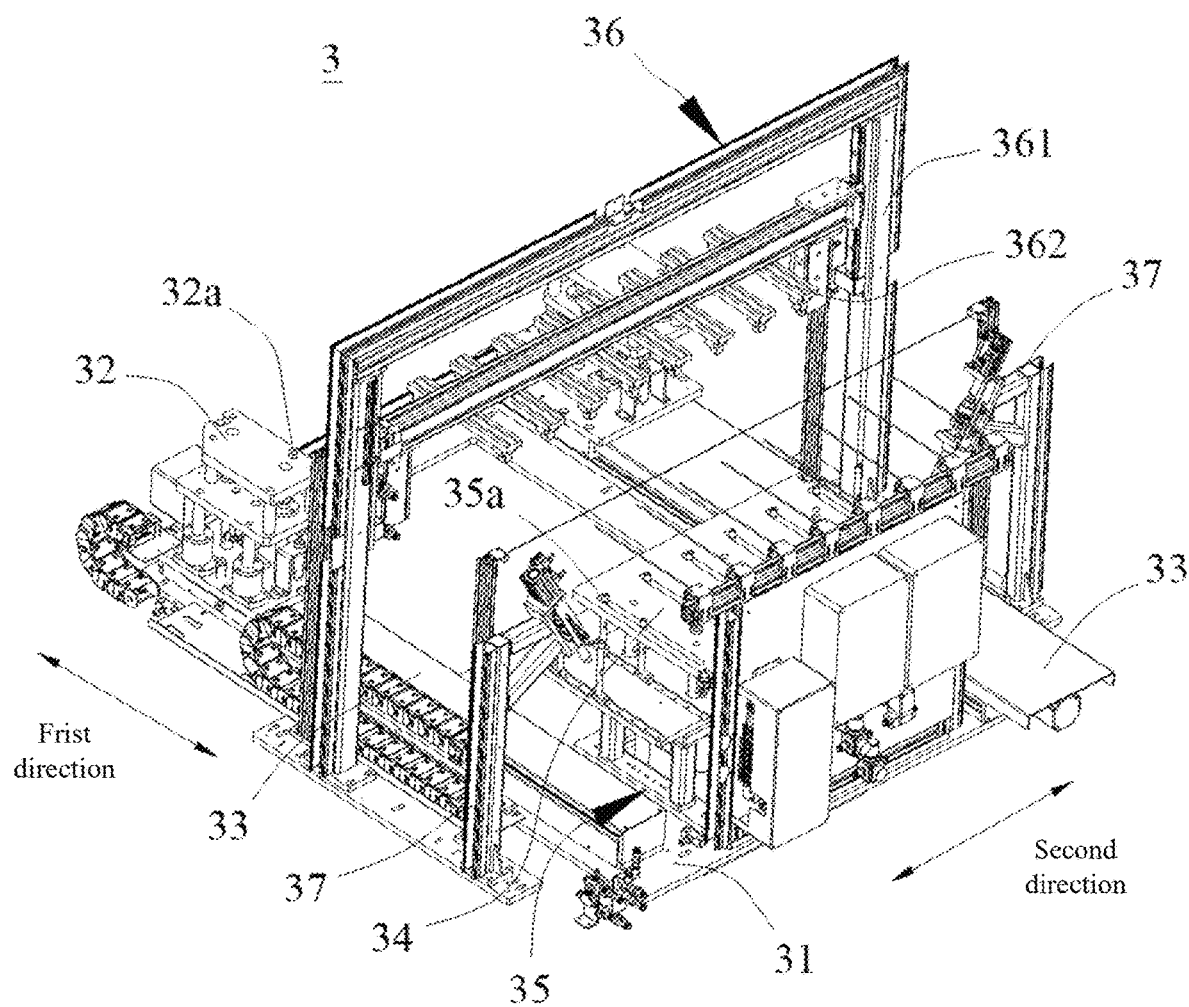
FIG. 4 is a schematic structural diagram of a transfer device at a second viewing angle according to an embodiment of the present disclosure.
Figure 5:
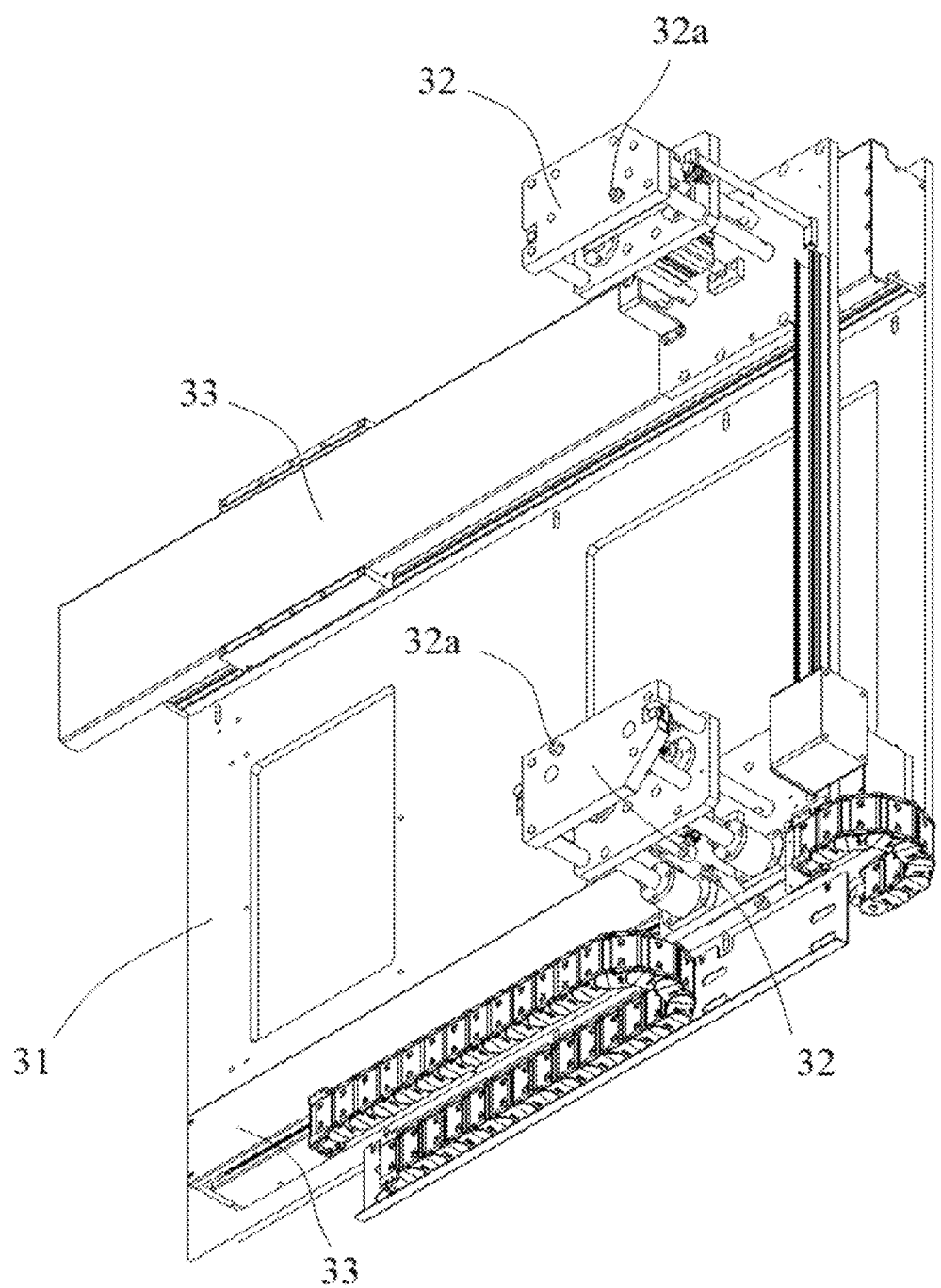
FIG. 5 is a schematic partial structural diagram of a transfer device according to an embodiment of the present disclosure.
Figure 7:
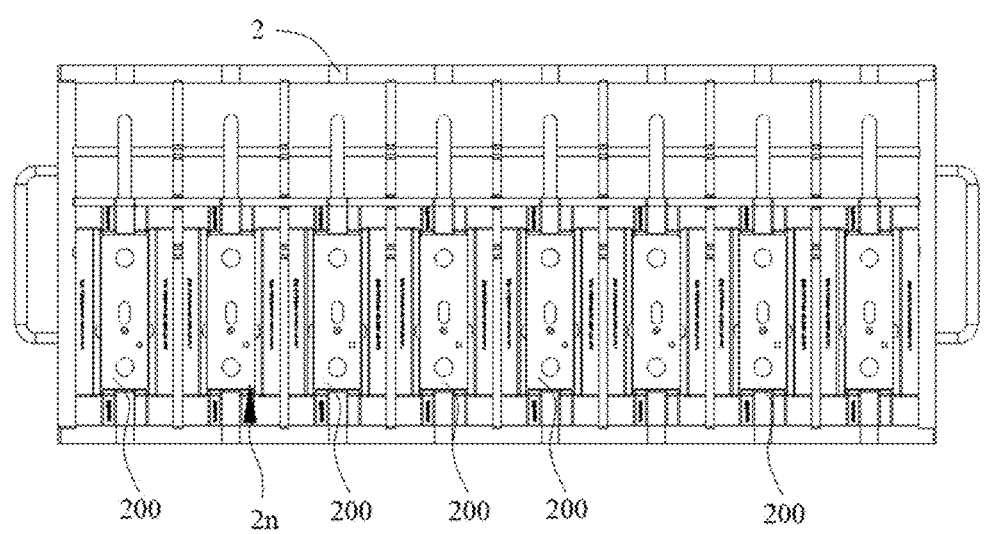
FIG. 7 is a schematic structural diagram of a fixture containing a battery according to an embodiment of the present disclosure.

In some embodiments, referring to FIG. 4, FIG. 7 and FIG. 8, the first avoidance slot 2d extends in the first direction, and there are a plurality of first avoidance slots 2d, all of which are arranged in a second direction, and the first direction intersects with the second direction.

The first direction intersects with the second direction, which means that the first direction and the second direction are not parallel in the same plane. Exemplarily, the first direction and the second direction may be perpendicular to each other.

The first avoidance slot 2d extends in the first direction. Exemplarily, the containing slot 2n also extends in the first direction, that is, an extension direction of the first avoidance slot 2d is consistent with that of the containing slot 2n, which is conducive to the cooperation between the push rod 35a and the battery 200.

It needs to be noted that there are a plurality of containing slots 2n in the fixture 2, and the plurality of containing slots 2n are arranged in the second direction. In this way, the fixture 2 may be provided with the plurality of containing slots 2n to accommodate a plurality of batteries 200 at the same time, which is conducive to transferring the batteries 200.

By setting the number of the first avoidance slots 2d to be multiple and arranging the first avoidance slots 2d in the second direction, a plurality of batteries 200 are ejected at the same time, which is conducive to improving the unloading efficiency of the batteries 200.

Correspondingly, there are a plurality of second avoidance slots 34b, the second avoidance slots 34b are arranged in the second direction, in this way, the plurality of batteries 200 are ejected at the same time, which is conducive to improving the unloading efficiency of the batteries 200.

In some embodiments, referring to FIG. 4, FIG. 7 and FIG. 8, the first avoidance slot 2d extends in the first direction. There are a plurality of push rods 35a in each first avoidance slot 2d, and the push rods 35a in the same first avoidance slot 2d are arranged at intervals in the first direction.

Exemplarily, the battery 200 extends in the first direction, that is, a length direction of the battery 200 is the first direction, and the plurality of batteries 200 are arranged in the second direction.

In order to eject the battery 200 more stably, the plurality of push rods 35a may be arranged in each first avoidance slot 2d, and the push rods 35a in the same first avoidance slot 2d are arranged in the length direction of the battery 200, which may improve the stability of the movement of the battery 200 in the height direction.

Exemplarily, the number of the push rods 35a in each first avoidance slot 2d is two.

By setting the number of push rods 35a to be multiple, the push rods 35a are arranged at intervals in the first direction, that is, the plurality of push rods 35a may cooperate with the battery 200 in the containing slot 2n at the same time to eject the battery 200, and the battery 200 may be ejected stably, which is further conducive to clamping the battery 200 out by the mechanical arm 37.

It may be understood that during the loading process, there are cases where individual batteries 200 cannot be fully assembled in place (i.e., not fully assembled into the containing slot 2n), which is not conducive to subsequent steps such as liquid injection.

Figure 3:
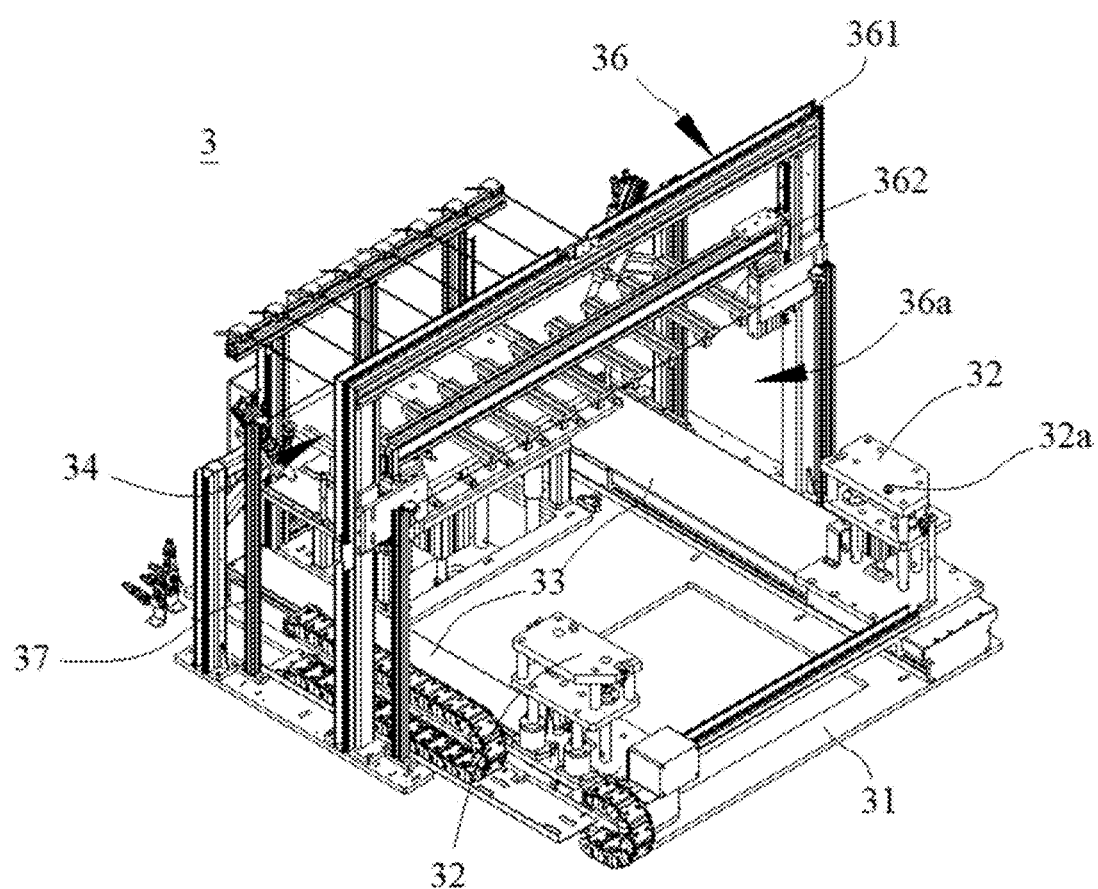
FIG. 3 is a schematic structural diagram of a transfer device at a first viewing angle according to an embodiment of the present disclosure.

In some embodiments, referring to FIG. 3 and FIG. 4, the transfer device 3 further includes an adjustment mechanism 36 arranged between the battery loading and unloading station 34 and the turnplate 1, and the adjustment mechanism 36 is configured to adjust the battery 200 on the fixture 2 so that the battery 200 is assembled in place.

The transfer device 3 further includes the adjustment mechanism 36 arranged between the battery loading and unloading station 34 and the turnplate 1. That is to say, the transfer device 3 will pass through the adjustment mechanism 36 during the process of transferring the fixture 2, which is conducive to adjusting the battery 200 on the fixture 2 by the adjustment mechanism 36, so that the battery 200 is assembled in place.

By arranging the adjustment mechanism 36 which is located between the battery loading and unloading station 34 and the turnplate 1, it is conducive to shortening a moving distance of the first jacking mechanism 32 and the driving module 33. The adjustment mechanism 36 adjusts the battery 200 on the fixture 2 so that the battery 200 is assembled in place, thus the liquid injection effect of the battery 200 is improved, and then the quality of the battery 200 is improved.

It needs to be noted that a specific type of the adjustment mechanism 36 is not limited here.

Exemplarily, in some embodiments, the adjustment mechanism 36 includes a mounting bracket 361 arranged on the base 31 and an adjusting member 362 arranged on the mounting bracket 361. An adjusting region 36a is formed below the mounting bracket 361. The adjusting member 362 corresponds to the battery 200 on the fixture 2 one by one, and moves in the height direction of the fixture 2 to adjust the battery 200 on the fixture 2 located in the adjusting region 36a.

The specific type of the mounting bracket 361 is not limited here. Exemplarily, the mounting bracket 361 is in the shape of a gantry, so that the adjusting region 36a is formed below the mounting bracket 361, and the mounting bracket 361 is configured to carry the adjusting member 362.

A specific type of the adjusting member 362 is not limited here. The adjusting member 362 is in a shape of a strip extending in the first direction, that is, extending in the length direction of the battery 200. Two ends of the adjusting member 362 in the first direction are provided with protruding adjusting portions, which is conducive to adjusting the battery 200.

It needs to be noted that a specific manner in which the adjusting member 362 moves in the height direction of the fixture 2 is not limited here, for example, it can be driven by a linear module.

The driving module 33 moves the fixture 2 on the first jacking mechanism 32 from the battery loading and unloading station 34 to the adjusting region 36a, and the adjusting member 362 moves from top to bottom to adjust the battery 200 on the fixture 2 located in the adjusting region 36a so that the battery 200 is assembled in place.

The adjustment mechanism 36 is configured to include the mounting bracket 361 and the adjusting member 362, the adjusting region 36a is formed below the mounting bracket 361, and the adjusting member 362 moves in the height direction of the fixture 2 to adjust the battery 200 on the fixture 2 located in the adjusting region 36a, so that the battery 200 is assembled in place. The structure is simple and reliable.

In some embodiments, referring to FIG. 1 to FIG. 4, the transfer device 3 further includes the mechanical arm 37 configured to load and unload the fixture 2 located on the battery loading and unloading station 34.

It needs to be noted that a specific type and a position of the mechanical arm 37 are not limited here, as long as it can load and unload the fixture 2 located on the battery loading and unloading station 34.

Exemplarily, the mechanical arm 37 is arranged on the base 31.

The mechanical arm 37 is configured to load and unload the fixture 2 located on the battery loading and unloading station 34, which is conducive to achieving the automatic machine operation and reducing labor cost.

In some embodiments, the transfer device 3 and the turnplate 1 are of a split structure.

The transfer device 3 and the turnplate 1 are of a split structure, which means that the transfer device 3 and the turnplate 1 are not integrally formed, that is, the transfer device 3 and the turnplate 1 are used as two independent components for use in cooperation.

In this embodiment, the transfer device 3 and the turnplate 1 are conveniently machined separately, and the difficulty and cost of machining the transfer device 3 and the turnplate 1 are reduced. In addition, it is also conducive to maintaining the transfer device 3.

In some implementations, please refer to FIG. 1 and FIG. 2, a fixture loading station 100a, a vacuumizing station, a liquid injection station and a still standing station are sequentially arranged on a periphery of the turnplate 1 in a circulation position of the fixture 2, and the transfer device 3 is arranged on the fixture loading station 100a.

The fixture loading station 100a is configured to load and unload the fixture 2, that is, to detachably mount the fixture 2 to the mounting region 1a of the turnplate 1.

The vacuumizing station is configured to vacuumize the battery 200 in the fixture 2 located at the vacuumizing station.

The liquid injection station is configured to perform liquid injection on the battery 200 in the fixture 2 located at the liquid injection station.

The still standing station is configured to perform stilling standing on the battery 200 in the fixture 2 located at the still standing station.

Exemplarily, the liquid injection system 100 further includes a vacuumizing mechanism and a liquid injection mechanism, and the vacuumizing mechanism and the liquid injection mechanism are respectively arranged on the vacuumizing station and the liquid injection station, which greatly reduces a size of the liquid injection system 100 in a length dimension and occupies a smaller floor area. After a liquid injection operation for the battery 200 completed, the fixture 2 may still stand at the still standing station to ensure a still standing effect of the battery 200, so that an electrolyte is in full contact with an electrode plate in the battery 200, thereby ensuring the use performance of the battery 200. When the battery 200 is loaded and unloaded on a battery 200 loading station and a battery 200 unloading station, the vacuumizing mechanism and the liquid injection mechanism may perform vacuumizing and liquid injection operations on the vacuumizing station and liquid injection station corresponding to them, which saves time of waiting for a material on the vacuumizing station and the liquid injection station and improves the machining efficiency of the liquid injection system 100. Placing the vacuumizing station and the liquid injection station outside the turnplate 1 is also conducive to the maintenance of gas, valves and other devices in the liquid injection system 100.

Exemplarily, an injection method of the liquid injection system 100 of the battery 200 applied to the embodiment of the present disclosure includes the following steps: the first jacking mechanism 32 of the transfer device 3 transfers the fixture 2 to the battery loading and unloading station 34, and the mechanical arm 37 loads the fixture 2; after the fixture 2 is loaded, the fixture 2 moves to the adjusting region 36a, and the adjustment mechanism 36 adjusts the battery 200 on the fixture 2 so that the battery 200 is assembled in place; the first jacking mechanism 32 transfers the fixture 2 into the fixture loading station 100a of the turnplate 1, and performs a liquid injection procedure; after the liquid injection is completed, the first jacking mechanism 32 transfers the fixture 2 to the battery loading and unloading station 34; the second jacking mechanism 35 of the battery loading and unloading station 34 ejects the battery 200; the mechanical arm 37 unloads the fixture 2, and loads a battery after unloading is completed, so as to implement a cycle.

In the description of the present disclosure, descriptions referring to terms such as "in an embodiment," "in some embodiments," "in some other embodiments," "in yet other embodiments," or "exemplary" are intended to indicate that specific features, structures, materials, or characteristics described in combination with the embodiment or example are included in at least one embodiment or example of the embodiments of the present disclosure. In the present disclosure, the illustrative representations of the aforementioned terms are not necessarily directed to the same embodiment or example. Moreover, the specific features, structures, materials, or characteristics described may be combined in any one or more embodiments or examples in a suitable manner. In addition, those skilled in the art may combine various embodiments or examples described in the present disclosure and features of the various embodiments or examples provided they are not contradictory to each other.

The above description is merely preferred embodiments of the present disclosure, but is not intended to limit the present disclosure. Those skilled in the art may make various modifications and changes to the present disclosure. Any modifications, equivalent replacements and improvements made within the spirit and principle of the present disclosure shall be included within the scope of protection of the present disclosure.

What is claimed is:
1. A liquid injection system for a battery, comprising:
   a rotatable turnplate, wherein a plurality of mounting regions are arranged on the turnplate, and the mounting regions are arranged at intervals in a circumferential direction of the turnplate;
   a fixture for carrying a battery, wherein one of the turnplate and the fixture is provided with a first plug-in slot, and the other is provided with a first plug-in piece, the first plug-in piece is plug-in fit with the first plug-in slot in a height direction of the fixture, so that the fixture is detachably mounted to the mounting region, and the fixture is capable of moving upward under the action of an external force to be separated from the turnplate, and the turnplate is rotated to drive the fixture to circulate in the circumferential direction of the turnplate; and a transfer device, comprising a base and a first jacking mechanism arranged on the base, wherein the first jacking mechanism is configured to drive the fixture to move in the height direction of the fixture so that the fixture is assembled to the turnplate or separated from the turnplate;

wherein:

the transfer device further comprises a driving module and a battery loading and unloading station, the driving module is configured to drive the first jacking mechanism to move in a first direction, the battery loading and unloading station is arranged on a side of the transfer device away from the turnplate in the first direction, and the first jacking mechanism is capable of moving the fixture away from the battery loading and unloading station or transferring the fixture to the battery loading and unloading station, wherein the first direction is perpendicular to the height direction; and the transfer device further comprises an adjustment mechanism arranged between the battery loading and unloading station and the turnplate, and the adjustment mechanism is configured to adjust the battery on the fixture so that the battery is assembled in place.

2. The liquid injection system according to claim 1, wherein the first jacking mechanism is supported at a bottom of the fixture.

3. The liquid injection system according to claim 1, wherein one of the first jacking mechanism and the fixture is provided with a second plug-in slot, another one of the first jacking mechanism and the fixture is provided with a second plug-in piece, and the second plug-in piece is plug-in fit with the second plug-in slot in the height direction of the fixture.

4. The liquid injection system according to claim 1, wherein the turnplate comprises a carrying member for carrying the fixture, a number of the first jacking mechanisms is two, and the two first jacking mechanisms are spaced apart and abut against the fixture to avoid the carrying member.

5. The liquid injection system according to claim 1, wherein one of the battery loading and unloading station and the fixture is provided with a third plug-in slot, another one of the battery loading and unloading station and the fixture is provided with a third plug-in piece, and the third plug-in piece is plug-in fit with the third plug-in slot in the height direction of the fixture.

6. The liquid injection system according to claim 5, wherein the first plug-in slot and the third plug-in slot are formed in the fixture and are the same plug-in slot in the fixture.

7. The liquid injection system according to claim 1, wherein the transfer device includes a second jacking mechanism arranged below the battery loading and unloading station, and the second jacking mechanism is configured to eject a battery in the fixture located on the battery loading and unloading station.

8. The liquid injection system according to claim 7, wherein a first avoidance slot is formed in a bottom of the fixture, the battery loading and unloading station is provided with a second avoidance slot corresponding to the first avoidance slot, and a push rod of the second jacking mechanism moves in the height direction of the fixture, extends into the fixture via the second avoidance slot and the first avoidance slot in sequence, and ejects the battery in the fixture.

9. The liquid injection system according to claim 8, wherein the first avoidance slot extends in the first direction, the first avoidance slot is one of a plurality of first avoidance slots, the plurality of first avoidance slots are arranged in a second direction, and the first direction intersects with the second direction.

10. The liquid injection system according to claim 9, wherein the plurality of first avoidance slots extend in the first direction, a plurality of push rods are in each of the plurality of first avoidance slots, and the plurality of push rods in one of the plurality of first avoidance slots are arranged at intervals in the first direction.

11. The liquid injection system according to claim 1, wherein the adjustment mechanism comprises a mounting bracket arranged on the base and an adjusting member arranged on the mounting bracket, an adjusting region is formed below the mounting bracket, the adjusting member corresponds one-to-one to the battery on the fixture, and moves in the height direction of the fixture to adjust the battery on the fixture located in the adjusting region.

12. The liquid injection system according to claim 11, wherein the mounting bracket is in a shape of a gantry.

13. The liquid injection system according to claim 11, wherein the adjusting member extends in the first direction, and two ends of the adjusting member in the first direction are provided with protruding adjusting portions.

14. The liquid injection system according to claim 1, wherein the transfer device further comprises a mechanical arm configured to load and unload the fixture located on the battery loading and unloading station.

15. The liquid injection system according to claim 1, wherein the transfer device and the turnplate are of a split structure.

16. The liquid injection system according to claim 1, wherein a fixture loading station, a vacuumizing station, a liquid injection station and a still standing station are sequentially arranged on a periphery of the turnplate in a circulation position of the fixture, and the transfer device is arranged on the fixture loading station.

17. The liquid injection system according to claim 1, wherein the turnplate comprises carrying members for carrying the fixture, a number of the carrying members is two, a number of the first jacking mechanisms is one, and the two carrying members are spaced apart to avoid the first jacking mechanism.

18. A transfer device, comprising:

a base;

a first jacking mechanism arranged on the base, wherein the first jacking mechanism is configured to drive a fixture of a liquid injection system to move in a height direction of the fixture so that the fixture is assembled to a turnplate of the liquid injection system or separated from the turnplate;

a driving module configured to drive the first jacking mechanism to move in a first direction, the first direction being perpendicular to the height direction;

a battery loading and unloading station arranged on a side of the transfer device away from the turnplate in the first direction, the first jacking mechanism being capable of moving the fixture away from the battery loading and unloading station or transferring the fixture to the battery loading and unloading station; and an adjustment mechanism arranged between the battery loading and unloading station and the turnplate, and configured to adjust a battery on the fixture so that the battery is assembled in place.

19. A liquid injection system for a battery, comprising:
- a rotatable turnplate, wherein a plurality of mounting regions are arranged on the turnplate, and the mounting regions are arranged at intervals in a circumferential direction of the turnplate;
- a fixture for carrying a battery, wherein one of the turnplate and the fixture is provided with a first plug-in slot, and the other is provided with a first plug-in piece, the first plug-in piece is plug-in fit with the first plug-in slot in a height direction of the fixture, so that the fixture is detachably mounted to the mounting region, and the fixture is capable of moving upward under the action of an external force to be separated from the turnplate, and the turnplate is rotated to drive the fixture to circulate in the circumferential direction of the turnplate; and
- a transfer device, comprising a base and a first jacking mechanism arranged on the base, wherein the first jacking mechanism is configured to drive the fixture to move in the height direction of the fixture so that the fixture is assembled to the turnplate or separated from the turnplate;
- wherein the turnplate comprises two carrying members for carrying the fixture, and the two carrying members are spaced apart to avoid the first jacking mechanism.

* * * * *